(12) United States Patent
Lam et al.

(10) Patent No.: US 8,745,079 B2
(45) Date of Patent: Jun. 3, 2014

(54) REDUCING LAG TIME WHEN SEARCHING A REPOSITORY USING A KEYWORD SEARCH

(75) Inventors: Yu Cong Lam, San Jose, CA (US); Paolo Juvara, Pamplona (ES)

(73) Assignee: Oracle International Corporation, Redwood Shores, CA (US)

( * ) Notice: Subject to any disclaimer, the term of this patent is extended or adjusted under 35 U.S.C. 154(b) by 191 days.

(21) Appl. No.: 12/181,475

(22) Filed: Jul. 29, 2008

(65) Prior Publication Data

US 2010/0030762 A1    Feb. 4, 2010

(51) Int. Cl.
*G06F 7/00*         (2006.01)
*G06F 17/30*        (2006.01)

(52) U.S. Cl.
CPC .... *G06F 17/30654* (2013.01); *G06F 17/30011* (2013.01)
USPC ............ 707/769; 707/713; 707/755; 707/765

(58) Field of Classification Search
CPC ..................... G06F 17/30011; G06F 17/30654
USPC ........................... 707/711, 713, 755, 765, 769
See application file for complete search history.

(56) References Cited

U.S. PATENT DOCUMENTS

| | | | |
|---|---|---|---|
| 5,685,003 A * | 11/1997 | Peltonen et al. | 715/202 |
| 6,243,723 B1 | 6/2001 | Ikeda et al. | |
| 6,516,312 B1 | 2/2003 | Kraft et al. | |
| 6,681,222 B2 | 1/2004 | Kabra et al. | |
| 6,687,696 B2 | 2/2004 | Hofmann et al. | |
| 7,236,932 B1 | 6/2007 | Grajski | |
| 7,546,287 B2 | 6/2009 | Subramaniam et al. | |
| 7,730,060 B2 | 6/2010 | Chakrabarti et al. | |
| 8,260,771 B1 | 9/2012 | Ortega et al. | |
| 2001/0014210 A1* | 8/2001 | Kang | 386/96 |
| 2002/0099685 A1* | 7/2002 | Takano et al. | 707/1 |
| 2003/0014429 A1 | 1/2003 | Heghe et al. | |
| 2003/0028603 A1 | 2/2003 | Aktas et al. | |
| 2004/0194141 A1* | 9/2004 | Sanders | 725/53 |
| 2004/0199491 A1 | 10/2004 | Bhatt | |
| 2004/0249804 A1 | 12/2004 | Nakayama et al. | |
| 2005/0177554 A1 | 8/2005 | Peltonen et al. | |
| 2005/0222894 A1 | 10/2005 | Klein et al. | |
| 2005/0251534 A1 | 11/2005 | Nunez | |
| 2006/0155685 A1 | 7/2006 | Grim et al. | |
| 2008/0065707 A1 | 3/2008 | Iwasaki et al. | |
| 2008/0082908 A1 | 4/2008 | MacGregor | |
| 2009/0063490 A1 | 3/2009 | Fuerst et al. | |
| 2009/0187551 A1 | 7/2009 | Lam et al. | |

OTHER PUBLICATIONS

"Microsoft Computer Dictionary, Fifth Edition," Microsoft Press, 2001.*

(Continued)

*Primary Examiner* — Cheyne D Ly
(74) *Attorney, Agent, or Firm* — Kilpatrick Townsend & Stockton LLP

(57) ABSTRACT

Embodiments of the invention provide systems and methods for searching a repository of information such as a database using a keyword search and/or an attribute search in near real time. According to one embodiment, a method of searching a repository of information can comprise receiving a set of search criteria for performing the search and selectively performing one or more of an attribute search and a keyword search of the information in the repository based on the received search criteria.

15 Claims, 7 Drawing Sheets

(56) References Cited

OTHER PUBLICATIONS

U.S. Appl. No. 12/015,606, filed Jan. 17, 2008, Office Action mailed Mar. 29, 2010, 23 pages.
U.S. Appl. No. 12/015,606, filed Jan. 17, 2008 Final Office Action mailed Oct. 21, 2010, 33 pages.
U.S. Appl. No. 12/015,606, filed Jan. 17, 2008, Final Office Action mailed May 4, 2012, 27 pages.
U.S. Appl. No. 12/015,606, filed Jan. 17, 2008, Office Action mailed Oct. 12, 2011, 21 pages.
U.S. Appl. No. 12/015,606, filed Jan. 17, 2008, Non-Final Office Action mailed Aug. 1, 2013, 22 pages.
U.S. Appl. No. 12/015,606, filed Jan. 17, 2008, Advisory Action mailed Jul. 26, 2012, 3 pages.
U.S. Appl. No. 12/015,606, Final Office Action mailed on Jan. 14, 2014, 22 pages.

* cited by examiner

FIG. 5

REDUCING LAG TIME WHEN SEARCHING A REPOSITORY USING A KEYWORD SEARCH

BACKGROUND OF THE INVENTION

Embodiments of the present invention relate generally to searching a corpus of information and more particularly to providing for searching a database using a keyword search in near real time.

Business objects such as orders, invoices, payments, documents, etc., stored in a database or other repository can be searched via applications that use, maintain, or access the information therein. An application that provides for searching records of a business object typically does so through a Structured Query Language (SQL) or similar query against the database. For example, a user can specify through a user interface one or more attributes of the business object to be found. Using the specified attributes, a query can be run against the business object and records containing the specified attributes can be returned or reported to the user.

In other cases, a keyword search can be performed on the contents of the database. For example, an index, e.g., a text index, can be generated based on the contents of the repository and a keyword search can be performed on the contents of the index. However, when the data in the repository is changed, a lag can occur between the time when the data is changed and when that data is available to be searched using such a keyword search. That is, since the change is not propagated to the index at the same time that the data in the repository is changed, a lag is occurs between the data change and its propagation to the index. If a keyword search is performed against the index during this lag time, the change will not be reflected in the results of the keyword search. The lag time can be reduced by frequently updating or re-generating the index. However, this approach reaches a point of impracticality as the update or re-generation of the index begins to compete for the same resources needed to process transaction on the repository. Therefore, updates to or re-generation of the index are typically performed during low demand periods.

As a result, the user is left with inaccurate or incomplete results. Assuming that the user is even aware of this problem, he can retry the keyword search at a later time, after the index is updated or re-generated. However, the user probably is not aware of when this may or may not happen. Alternatively, the user may decide to simply rely on the results of an attribute search, i.e., an SQL or other query against the database or repository. However, this search may not yield the same or even similar results as a keyword search. Hence, there is a need for improved methods and systems for searching a repository of information such as a database using a keyword search and/or an attribute search in near real time.

BRIEF SUMMARY OF THE INVENTION

Embodiments of the invention provide systems and methods for searching a repository of information such as a database using a keyword search and/or an attribute search in near real time. According to one embodiment, a method of searching a repository of information can comprise receiving a set of search criteria for performing the search and selectively performing one or more of an attribute search and a keyword search of the information in the repository based on the received search criteria.

Selectively performing one or more of the attribute search and the keyword search based on the received search criteria can comprise determining whether the received criteria contains only criteria indicating attributes to be searched, only criteria indicating keywords to be searched, or both criteria indicating attributes to be searched and criteria indicating keywords to be searched. In response to determining the received search criteria contains only criteria indicating attributes to be searched, only the attribute search may be performed. In response to determining the received search criteria contains only criteria indicating keywords to be searched, only the keyword search may be performed. In response to determining the received search criteria contains both criteria indicating attributes to be searched and criteria indicating keywords to be searched, the keyword search can be performed. Results of the keyword search can then be filtered based on the criteria indicating attributes to be searched.

Results of selectively performing one or more of the attribute search and the keyword search can be displayed. Displaying results of selectively performing one or more of the attribute search and the keyword search can comprise determining the keyword search was performed. For example, performing the keyword search can comprise searching an index of data in the repository. In such a case, a time at which the index was generated can be determined and displayed with results of the keyword search. In some cases, a request to update the index can be received. In response to the request, the index of data in the repository can be updated, a time the index was updated can be recorded and the index can be made available for a later search.

According to another embodiment, a system can comprise a processor and a memory communicatively coupled with and readable by the processor. The memory can contain instructions which, when executed by the processor, cause the processor to receive a set of search criteria for performing a search of a repository of information and selectively perform one or more of an attribute search and a keyword search of the information in the repository based on the received search criteria. Selectively performing one or more of the attribute search and the keyword search based on the received search criteria can comprise determining whether the received criteria contains only criteria indicating attributes to be searched, only criteria indicating keywords to be searched, or both criteria indicating attributes to be searched and criteria indicating keywords to be searched. In response to determining the received search criteria contains only criteria indicating attributes to be searched, only the attribute search may be performed. In response to determining the received search criteria contains only criteria indicating keywords to be searched, only the keyword search may be performed. In response to determining the received search criteria contains both criteria indicating attributes to be searched and criteria indicating keywords to be searched, the keyword search can be performed. Results of the keyword search can then be filtered based on the criteria indicating attributes to be searched.

Results of selectively performing one or more of the attribute search and the keyword search can be displayed. Displaying results of selectively performing one or more of the attribute search and the keyword search can comprise determining the keyword search was performed. For example, performing the keyword search can comprise searching an index of data in the repository. In such a case, a time at which the index was generated can be determined and displayed with results of the keyword search. In some cases, a request to update the index can be received. In response to the request, the index of data in the repository can be updated, a time the index was updated can be recorded and the index can be made available for a later search.

According to yet another embodiment a machine-readable medium can have stored thereon a series of instructions which, when executed by a processor, cause the processor to search a repository of information using one or more of an attribute search and a keyword search by receiving a set of search criteria for performing the search and selectively performing one or more of an attribute search and a keyword search of the information in the repository based on the received search criteria. Selectively performing one or more of the attribute search and the keyword search based on the received search criteria can comprise determining whether the received criteria contains only criteria indicating attributes to be searched, only criteria indicating keywords to be searched, or both criteria indicating attributes to be searched and criteria indicating keywords to be searched. In response to determining the received search criteria contains only criteria indicating attributes to be searched, only the attribute search may be performed. In response to determining the received search criteria contains only criteria indicating keywords to be searched, only the keyword search may be performed. In response to determining the received search criteria contains both criteria indicating attributes to be searched and criteria indicating keywords to be searched, the keyword search can be performed. Results of the keyword search can then be filtered based on the criteria indicating attributes to be searched.

Results of selectively performing one or more of the attribute search and the keyword search can be displayed. Displaying results of selectively performing one or more of the attribute search and the keyword search can comprise determining the keyword search was performed. For example, performing the keyword search can comprise searching an index of data in the repository. In such a case, a time at which the index was generated can be determined and displayed with results of the keyword search. In some cases, a request to update the index can be received. In response to the request, the index of data in the repository can be updated, a time the index was updated can be recorded and the index can be made available for a later search.

BRIEF DESCRIPTION OF THE DRAWINGS

FIG. 5 illustrates an exemplary user interface for displaying search results according to one embodiment of the present invention.

DETAILED DESCRIPTION OF THE INVENTION

Figure 1:
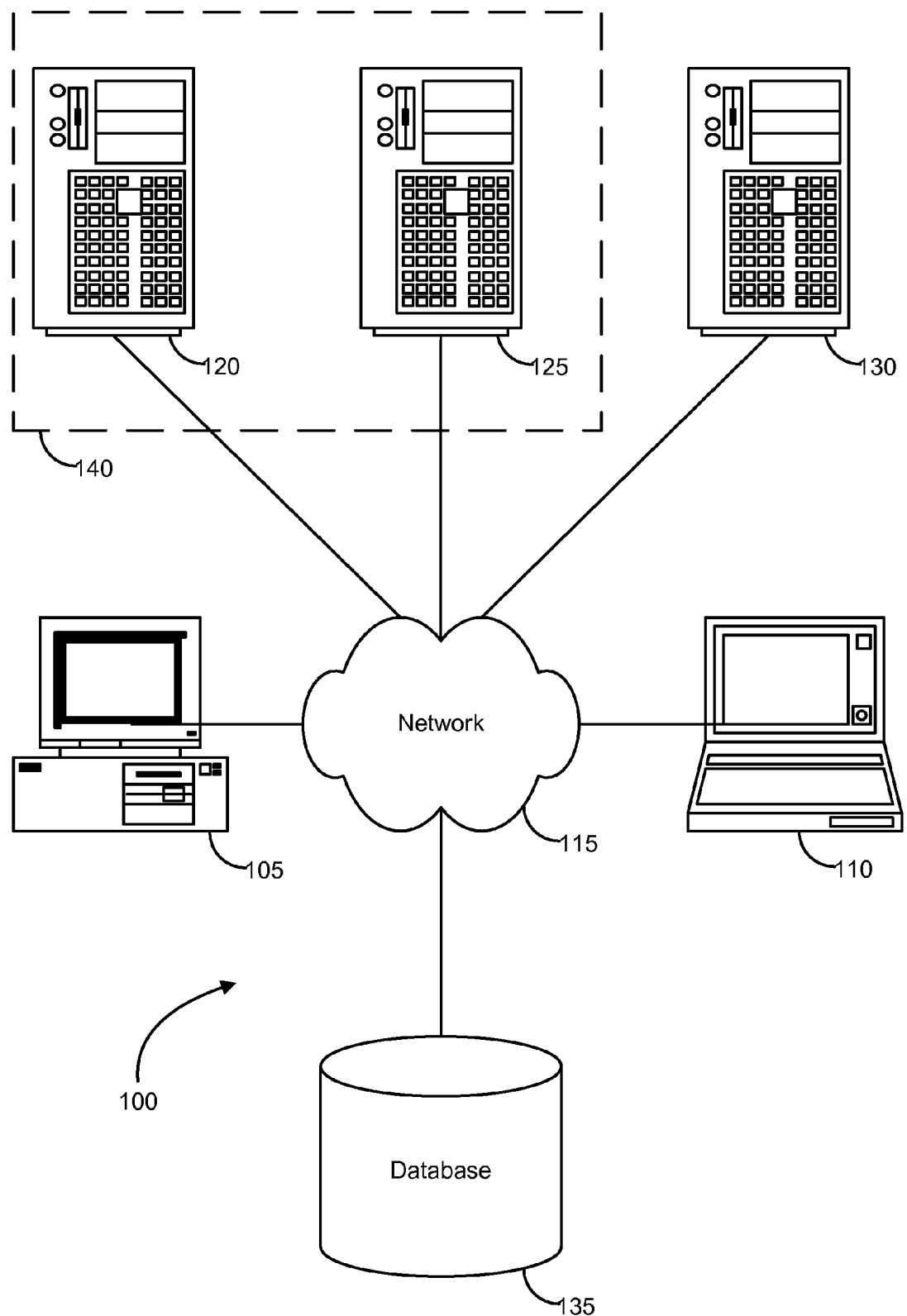
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes might be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for searching a repository of information such as a database. More specifically, embodiments of the present invention provide for selectively performing an attribute search, a keyword search, or both an attribute and a keyword search based on the search criteria provided. Additionally or alternatively, when displaying results of a keyword search, an indication of a last time an index used in the search was generated or updated can also be displayed. Based on this time, a re-generation or update of the index can be requested.

Stated another way, searching a repository of information can comprise receiving a set of search criteria for performing the search and selectively performing one or more of an attribute search and a keyword search of the information in the repository based on the received search criteria. Selectively performing one or more of the attribute search and the keyword search based on the received search criteria can comprise determining whether the received criteria contains only criteria indicating attributes to be searched, only criteria indicating keywords to be searched, or both criteria indicating attributes to be searched and criteria indicating keywords to be searched. In response to determining the received search criteria contains only criteria indicating attributes to be searched, only the attribute search may be performed. In response to determining the received search criteria contains only criteria indicating keywords to be searched, only the keyword search may be performed. In response to determining the received search criteria contains both criteria indicating attributes to be searched and criteria indicating keywords to be searched, the keyword search can be performed. Results of the keyword search can then be filtered based on the criteria indicating attributes to be searched.

Results of selectively performing one or more of the attribute search and the keyword search can be displayed. Displaying results of selectively performing one or more of the attribute search and the keyword search can comprise determining the keyword search was performed. For example, performing the keyword search can comprise generating an index of data in the repository and searching the index. In such a case, a time at which the index was generated can be determined and displayed with results of the keyword search. In some cases, a request to update the index can be received. In response to the request, a new index of data in the repository can be generated and the new index can be searched. Additional details of various embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk®, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 140) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g. via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
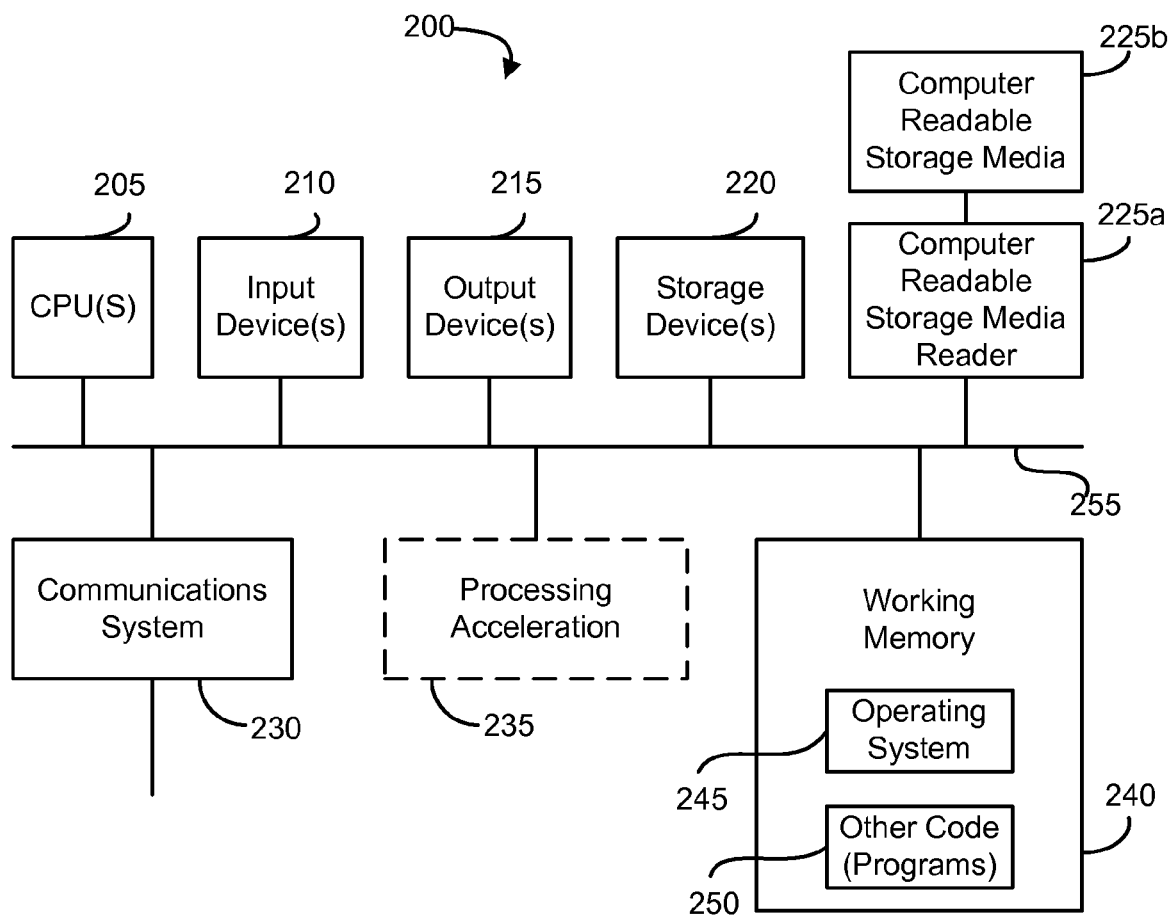
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225*a*, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225*a* can further be connected to a computer-readable storage medium 225*b*, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
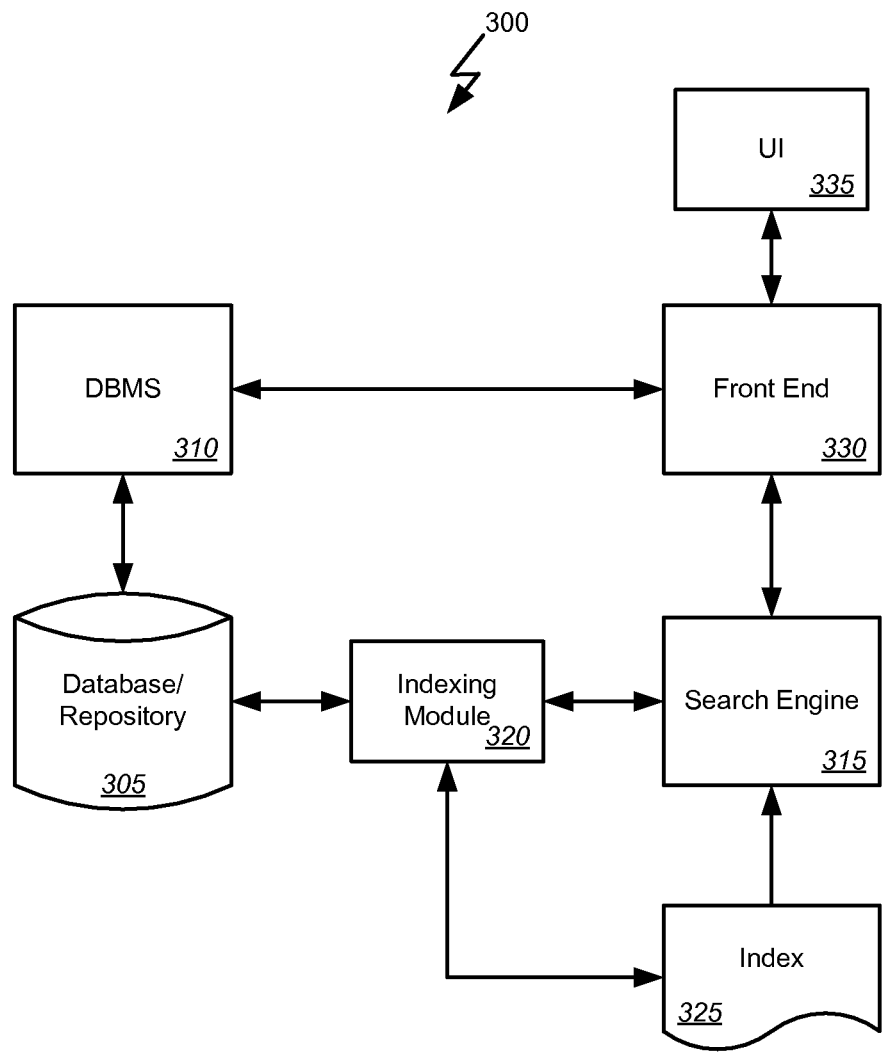
FIG. 3 is a block diagram illustrating, at a high-level, functional components of a system for searching a repository of information according to one embodiment of the present invention.

FIG. 3 is a block diagram illustrating, at a high-level, functional components of a system for searching a repository of information according to one embodiment of the present invention. In this example, the system 300 includes a database 305 or other repository containing a corpus of information. As known in the art, the information in the database 305 can be organized into one or more tables. Each table can include a number of records which in turn can include any number of attributes.

The system 300 can also include a database management system 310 for maintaining and accessing the information of the database 305. For example, the database management system 310 can be used to query the database 305 to affect an attribute search of the information in the database 305. That is, through the database management system 310, a user can issue a query, such as an SQL query for example, to find records having attributes matching those of or satisfying the query.

The system 300 can also include a search engine 315 for performing a keyword search on the contents of the database 305. For example, the database management system 310 can be used to query the database 305 to affect an attribute search of the information in the database 305. That is, through the search engine 315, a user can request or initiate a keyword search to find records containing information matching keywords provided by the user. Methods and systems for implementing such a search engine 315 are described, for example, in U.S. patent application Ser. No. 12/015,606 filed Jan. 17, 2008 by Lam and entitled "Improved Search Results when Searching for records of a Business Object" (hereinafter "the referenced application"), the entire disclosure of which is incorporated herein by reference for all purposes. However, while provided by way of example and to provide a complete understanding of one possible implementation, such methods and systems are not required for implementing embodiments of the present invention. Rather, other types of search engines and methods are contemplated and considered to within the scope of the present invention. It should also be noted that, while illustrated here as separate from the database 305 and database management system 310, the search engine 315 need not be separate. Rather, depending upon the exact implementation, the search engine 315 can be part of or implemented in the database 305 and/or the database management system 310.

The system can also include an indexing module 320. It should be noted that, while illustrated here as a separate component for the sake of clarity, the indexing module 320 need not be implemented separate from other elements of the system 300. For example, the indexing module 320 may be implemented as part of the search engine 315, database 305, and/or database management system 310, etc. Regardless of exactly how it is implemented, the indexing module 320 creates an index 325 of the contents of the database which can in turn be searched by the search engine 315. Such methods are described for example, in the referenced application cited above.

The system 300 can also include a front end 330 such as a web service or other system. Generally speaking, the front end 330 can provide a user interface 335, such a one or more web pages or other graphical or no-graphical interfaces, to a user. Exemplary user interfaces 335 will be described in detail below with reference to FIGS. 4 and 5. As will be seen, through the user interface 335 a user of the system 300 can enter one or more search criteria for searching attributes, keywords, or both and can initiate a search based on the entered criteria. Furthermore, the results of the search can be provided to the user via the user interface 335.

In use, the system 300, via the user interface 335 and front end 330, can receive a set of search criteria for performing the search and selectively performing one or more of an attribute search, e.g., via the database management system 310, and a keyword search, e.g., via the search engine 315, of the information in the repository 305 based on the received search criteria. Selectively performing one or more of the attribute search and the keyword search based on the received search criteria can comprise determining whether the received criteria contains only criteria indicating attributes to be searched, only criteria indicating keywords to be searched, or both criteria indicating attributes to be searched and criteria indicating keywords to be searched. Additional details of selectively performing an attribute search and/or keyword search will be described below with reference to FIG. 6. Results of selectively performing one or more of the attribute search and the keyword search can be displayed, e.g., via the front end 330 and user interface 335. Additional details of displaying the results of selectively performing one or more of the attribute search and the keyword search will be described below with reference to FIG. 7.

Figure 4:
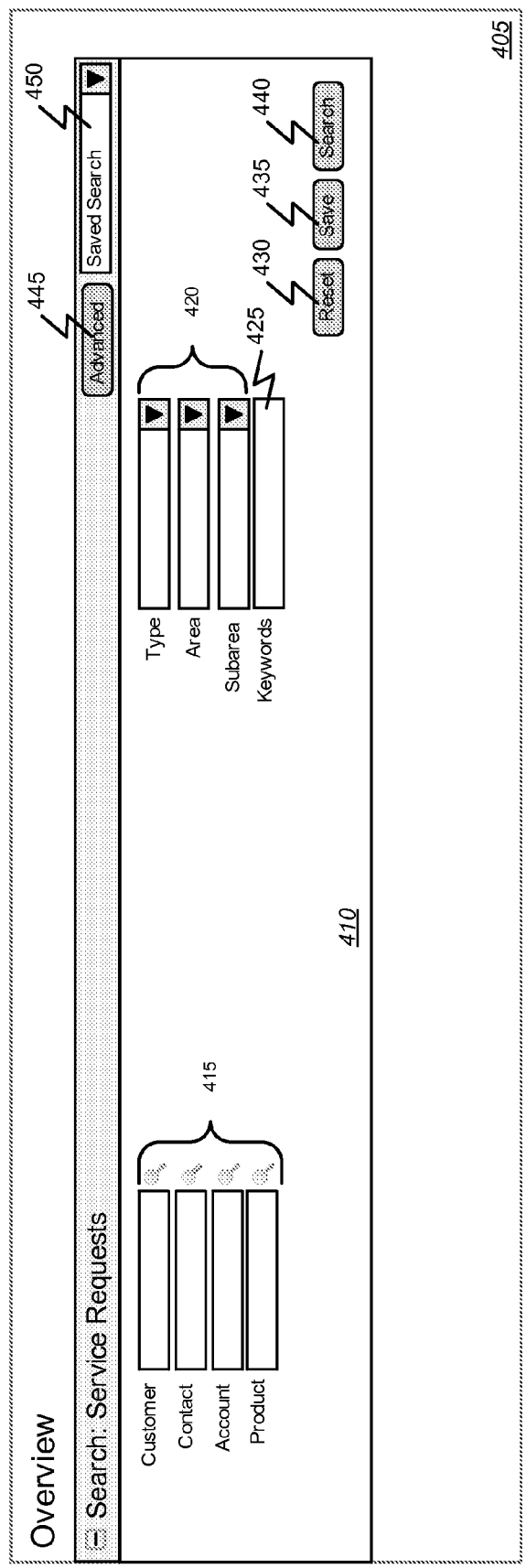
FIG. 4 illustrates an exemplary user interface for entering search criteria according to one embodiment of the present invention.

FIG. 4 illustrates an exemplary user interface for entering search criteria according to one embodiment of the present invention. In this example, the user interface comprises a web page 405 that can be displayed, for example via the user's web browser. In other implementations, the interface can comprise another type of graphical, textual, or other interface. In this example, the web page 405 includes a dialog box 410 that includes a number of elements 415-450 through which the user can enter search criteria and initiate or control the search.

For example, the dialog box 410 can include a set of one or more text boxes 415 for entering attribute values to be searched for. Additionally or alternatively, the dialog box 410 can include a set of one or more combo boxes 420 through which attribute values can be selected or entered. The dialog box 410 can also include one or more text boxes 425 through which the user can enter keywords values to be searched. As illustrated in this example, the dialog box can also include a set of buttons 430-440 or other elements for controlling the search. For example, these elements can include a "reset" button 430 for clearing the contents of the text boxes 415 and 425 and/or combo boxes 420, a "save" button 435 for saving the criteria specified in the text boxes 415 and 425 and/or combo boxes 420, and a "search" button 440 for initiating or starting a search. The dialog box can also include an "advanced" button 445 for opening another dialog box (not shown here) or otherwise displaying additional options for criteria or controls for the search and/or a combo box 450 for selecting a previously saved set of criteria. It should be understood that the interface illustrated here is provided by way of example only to provide a complete understanding of one possible implementation and is not intended to limit the scope of the present invention. Rather, the exact nature, content, format, etc of the interface can vary greatly between implementations without departing from the scope of the present invention.

Figure 5:
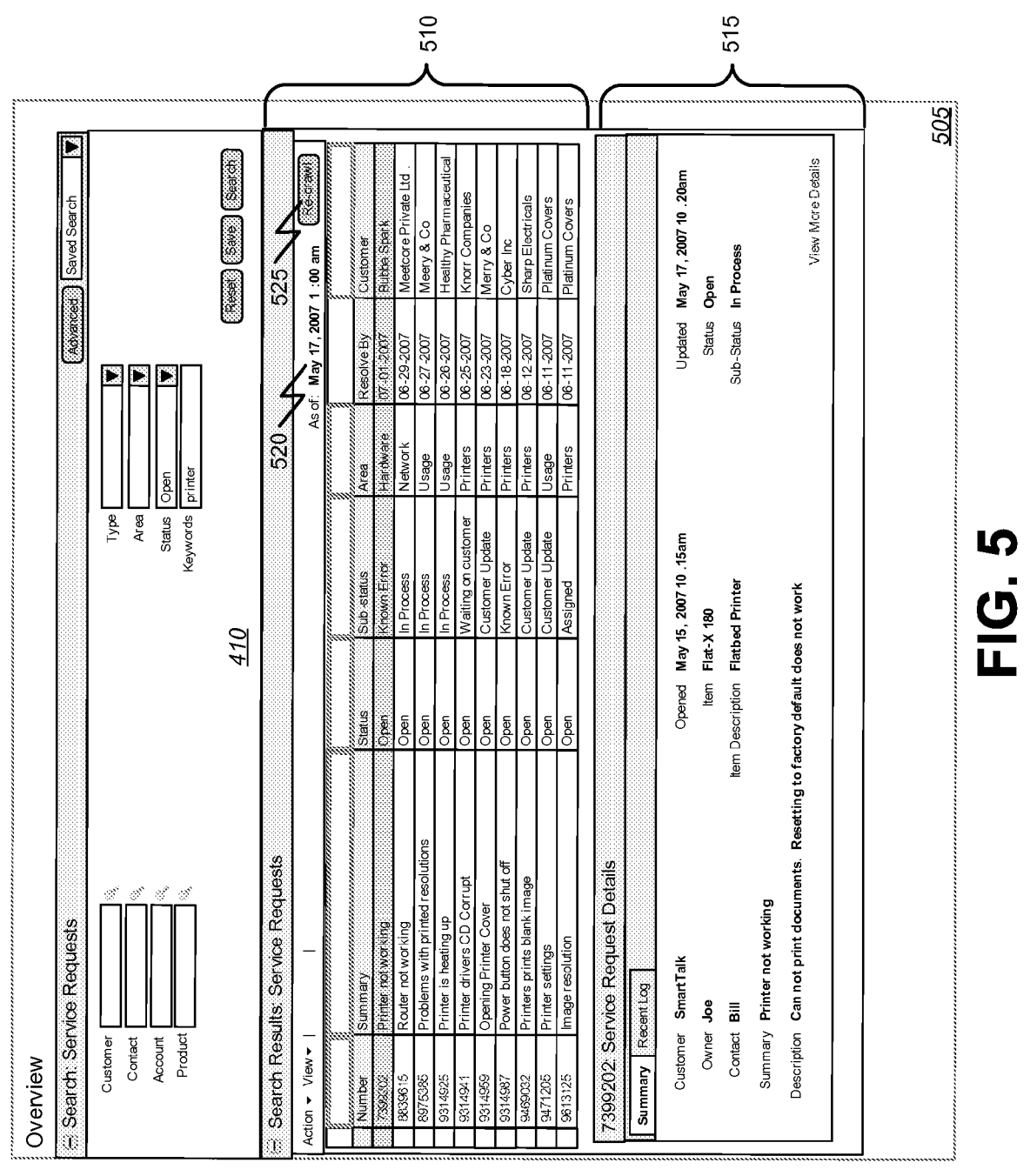

FIG. 5 illustrates an exemplary user interface for displaying search results according to one embodiment of the present invention. In this example, the user interface comprises a web page 505 that can be displayed, for example via the user's web browser. In other implementations, the interface can comprise another type of graphical, textual, or other interface. In this example, the web page 505 includes the dialog box 410 described above with reference to FIG. 4 through which the user enters the search criteria and controls the search. Also displayed on the web page 505 can be a summary or list 510 of search results, i.e., records that were found by either or both of the keyword search and/or attribute search to match or otherwise satisfy the criteria specified in the dialog box 410. The web page 505 can also include a "details" section 515 displaying details of a currently selected record from the list 510 of records.

Also displayed on the web page 505 can be an indication 520 of the time at which the index of the database was last updated or re-generated. However, according to one embodiment, display of this indication 520 may be made only if a keyword search was performed. That is, displaying results of selectively performing one or more of the attribute search and the keyword search can comprise determining the keyword search was performed. If the keyword search was performed, i.e., keywords were specified by the user, a time at which the index upon which the search was performed was generated can be determined and an indication 520 of the time can be displayed with results of the keyword search. The web page can also include a button 525 or other element for requesting a "re-crawl" or re-generation of the index. That is, if the user determines the index is not new enough to be useful for his search, the user can request that the index be updated or re-generated. This can be performed, for example, immediately, as soon as possible, at some scheduled time etc. Upon update of the index, a new search may be performed and new results presented.

As noted above, it should be understood that the interface illustrated here is provided by way of example only to provide a complete understanding of one possible implementation and is not intended to limit the scope of the present invention. Rather, the exact nature, content, format, etc of the interface can vary greatly between implementations without departing from the scope of the present invention.

Figure 6:
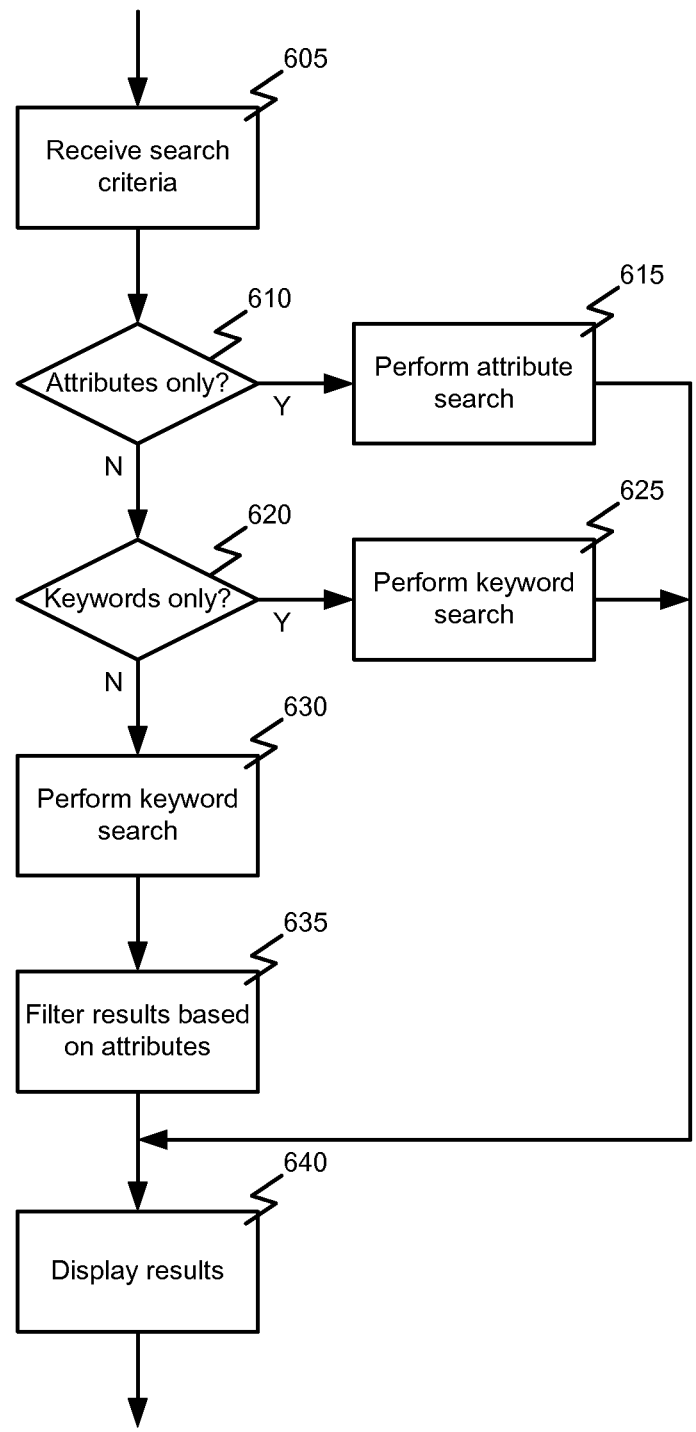
FIG. 6 is a flowchart illustrating details of a process for performing a search according to one embodiment of the present invention.

FIG. 6 is a flowchart illustrating details of a process for performing a search according to one embodiment of the present invention. In this example, the process begins with receiving 605 a set of search criteria for performing the search. As noted above, the criteria can include indications of attribute values, keywords, or both.

Also as noted above, the process can also include selectively performing one or more of an attribute search and a keyword search of the information in the repository based on the received search criteria. As illustrated in FIG. 6, selectively performing one or more of the attribute search and the keyword search based on the received search criteria can comprise determining 610 whether the received criteria contains only criteria indicating attributes to be searched. In response to determining 610 the received search criteria contains only criteria indicating attributes to be searched, the attribute search can be performed 615. The results of the attribute search can then be displayed 640. Displaying 640 the results of the attribute search can be performed, for example, according to the process described below with reference to FIG. 7 and may be presented in a user interface such as illustrated by FIG. 5.

If a determination 610 is made that the search criteria does not contain only attribute values to be searched, selectively performing one or more of the attribute search and the keyword search based on the received search criteria can further comprise determining 620 whether the received criteria contains only criteria indicating keywords to be searched. In response to determining 620 the received search criteria contains only criteria indicating keywords to be searched, only the keyword search may be performed 625. The results of the keyword search can then be displayed 640. Displaying 640 the results of the keyword search can be performed, for example, according to the process described below with reference to FIG. 7 and may be presented in a user interface such as illustrated by FIG. 5.

If 610 the criteria does not contain only criteria indicating attributes to be searched and if 620 the criteria does not contain only criteria indicating keywords to be searched, i.e., it is determined 610 and 620 that the search criteria includes both criteria indicating attributes to be searched and criteria indicating keywords to be searched, the keyword search can be performed 630. Results of the keyword search can then be filtered 635 based on the criteria indicating attributes to be searched. The filtered results can then be displayed 640. Displaying 640 the results of the keyword search can be performed, for example, according to the process described below with reference to FIG. 7 and may be presented in a user interface such as illustrated by FIG. 5.

Figure 7:
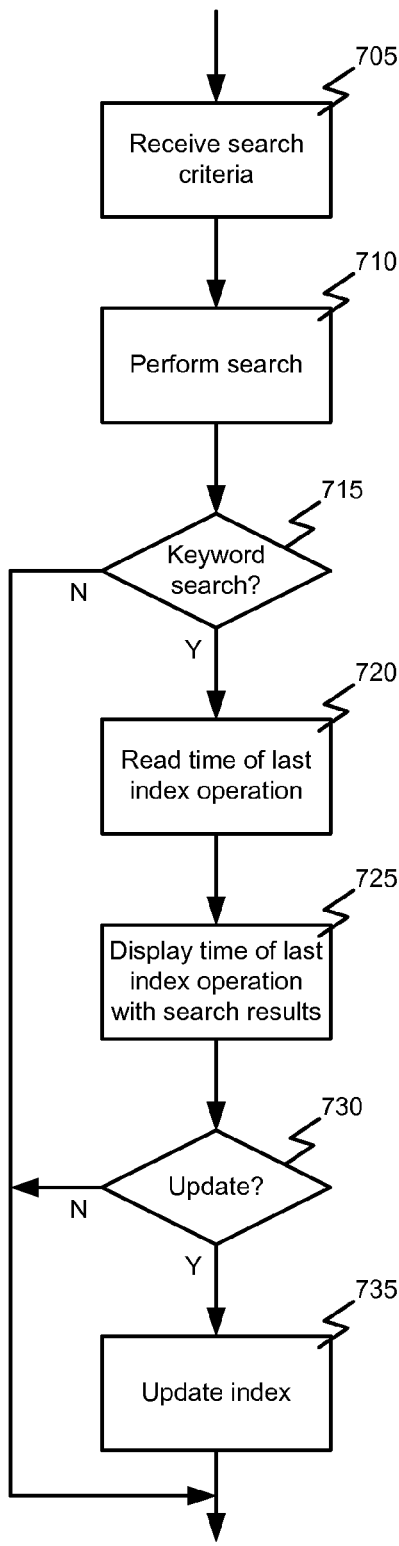
FIG. 7 is a flowchart illustrating additional, optional details of a process for performing a search according to one embodiment of the present invention.

FIG. 7 is a flowchart illustrating additional, optional details of a process for performing a search according to one embodiment of the present invention. In this example, the process begins with receiving 705 a set of search criteria for performing the search. As noted above, the criteria can include indications of attribute values, keywords, or both. The search can be performed 710 based on the received criteria. The search can be performed 710 as described above with reference to FIG. 6. However, it should noted that the process described above with reference to FIG. 6 and the process described here with reference to FIG. 7 need not depend upon one another. That is, the search process and the display process are independent but not mutually exclusive. Therefore, performing 710 the search can comprise performing the process described above or any other search process.

Regardless of the exact search process used, a determination 715 can be made as to whether a keyword search was performed. In response to determining that a keyword search was performed, either as the only search or in conjunction with an attribute search, a time at which the index upon which the keyword search was performed was generated can be determined 720 and displayed 725 with results of the keyword search. In some cases, a request to update the index can be received, e.g., by the user clicking a button or otherwise requesting the update through an interface such as described above with reference to FIG. 5. If 730 a request to update the index is received, a new index of data in the repository can be generated 735 or the index can otherwise be updated. In some cases, the new index can be used in a new search, i.e., the search 710 can be repeated and the results displayed as described here.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for searching a repository of information, the method comprising:
receiving at a computer system maintaining the repository of information sets of search criteria for performing a plurality of searches; and selectively performing by the computer system one or more of an attribute search and a keyword search of the information in the repository based on each of the received sets of search criteria and further based on whether the received search criteria indicates only keywords, only attributes, or both keywords and attributes, wherein the computer system executes a DataBase Management System (DBMS) and a search engine, wherein the repository comprises a plurality of tables storing the information and an index file, wherein the index file comprises a file generated and maintained by the computer system and representing contents of each of the tables, wherein the index file comprises a plurality of records, each record identifying one or more records of one or more tables, and wherein selectively performing one or more of the attribute search and the keyword search based on each of the received sets of search criteria comprises:
determining by the computer system for each of the received sets of criteria whether the received criteria contains only criteria indicating attributes to be searched, only criteria indicating keywords to be searched, or both criteria indicating attributes to be searched and criteria indicating keywords to be searched;
for a received set of criteria containing only criteria indicating attributes to be searched, not performing the keyword search and performing only the attribute search by searching data of the repository by executing a query of the DBMS on the tables of the repository;
for a received set of criteria containing only criteria indicating keywords to be searched not performing the attribute search and performing only the keyword search by searching the index file of data in the repository using the search engine; and
for a received set of criteria containing both criteria indicating attributes to be searched and criteria indicating keywords to be searched, performing the keyword search by searching the index file of the data in the repository using the search engine and filtering results of the keyword search based on the criteria indicating attributes to be searched without performing the attribute search on all of the data of the repository.

2. The method of claim 1, further comprising displaying by the computer system results of selectively performing one or more of the attribute search and the keyword search.

3. The method of claim 2, wherein displaying results of selectively performing one or more of the attribute search and the keyword search comprises determining the keyword search was performed.

4. The method of claim 1, further comprising determining by the computer system a time the index file was generated and displaying the time the index file was generated with results of the keyword search.

5. The method of claim 4, further comprising receiving at the computer system a request to update the index file and, in response to the request, updating by the computer system the index file of data in the repository and recording the time the index file was updated.

6. A system comprising:
a processor; and
a memory communicatively coupled with and readable by the processor, the memory containing instructions which, when executed by the processor, cause the processor to receive sets of search criteria for performing a plurality of searches of a repository of information and selectively perform one or more of an attribute search and a keyword search of the information in the repository based on each of the received sets of search criteria and further based on whether the received search criteria indicates only keywords, only attributes, or both keywords and attributes, wherein selectively performing one or more of the attribute search and the keyword search based on each of the received sets of search criteria comprises:

determining for each of the received sets of criteria whether the received criteria contains only criteria indicating attributes to be searched, only criteria indicating keywords to be searched, or both criteria indicating attributes to be searched and criteria indicating keywords to be searched;

for a received set of criteria containing only criteria indicating attributes to be searched, not performing the keyword search and performing only the attribute search by searching data of the repository by executing a query of a DataBase Management System (DBMS) on a plurality of tables of the repository;

for a received set of criteria containing only criteria indicating keywords to be searched not performing the attribute search and performing only the keyword search on an index file, wherein the index file comprises a file generated and maintained by the system and representing data in the plurality of tables of the repository and wherein the index file comprises a plurality of records, each record identifying one or more records of one or more tables; and for a received set of criteria containing both criteria indicating attributes to be searched and criteria indicating keywords to be searched, performing the keyword search on the index file of the data in the plurality of tables of the repository and filtering results of the keyword search based on the criteria indicating attributes to be searched.

7. The system of claim 6, further comprising displaying results of selectively performing one or more of the attribute search and the keyword search.

8. The system of claim 7, wherein displaying results of selectively performing one or more of the attribute search and the keyword search comprises determining the keyword search was performed.

9. The system of claim 6, further comprising determining a time the index file was generated and displaying the time the index file was generated with results of the keyword search.

10. The system of claim 9, further comprising receiving a request to update the index file and, in response to the request, updating the index file of data in the repository and recording the time the index file was updated.

11. A machine-readable memory having stored thereon a series of instructions which, when executed by a processor, cause the processor to search a repository of information using one or more of an attribute search and a keyword search by:

receiving sets of search criteria for performing a plurality of searches; and selectively performing one or more of an attribute search and a keyword search of the information in the repository based on each of the received sets of search criteria and further based on whether the received search criteria indicates only keywords, only attributes, or both keywords and attributes, wherein selectively performing one or more of the attribute search and the keyword search based on each of the received sets of search criteria comprises:

determining for each of the received sets of criteria whether the received criteria contains only criteria indicating attributes to be searched, only criteria indicating keywords to be searched, or both criteria indicating attributes to be searched and criteria indicating keywords to be searched;

for a received set of criteria containing only criteria indicating attributes to be searched, not performing the keyword search and performing only the attribute search by searching data of the repository by executing a query of a DataBase Management System (DBMS) on a plurality of tables of the repository;

for a received set of criteria containing only criteria indicating keywords to be searched not performing the attribute search and performing only the keyword search on an index file, wherein the index file comprises a file generated and maintained by the computer system and representing data in the plurality of tables of the repository and wherein the index file comprises a plurality of records, each record identifying one or more records of one or more tables; and for a received set of criteria containing both criteria indicating attributes to be searched and criteria indicating keywords to be searched, performing the keyword search on the index file of the data in the plurality of tables of the repository and filtering results of the keyword search based on the criteria indicating attributes to be searched.

12. The machine-readable memory of claim 11, further comprising displaying results of selectively performing one or more of the attribute search and the keyword search.

13. The machine-readable memory of claim 12, wherein displaying results of selectively performing one or more of the attribute search and the keyword search comprises determining the keyword search was performed.

14. The machine-readable memory of claim 11, further comprising determining a time the index file was generated and displaying the time the index file was generated with results of the keyword search.

15. The machine-readable memory of claim 14, further comprising receiving a request to update the index file and, in response to the request, updating the index file of data in the repository and recording the time the index file was updated.

\* \* \* \* \*

UNITED STATES PATENT AND TRADEMARK OFFICE
CERTIFICATE OF CORRECTION

PATENT NO. : 8,745,079 B2  Page 1 of 1
APPLICATION NO. : 12/181475
DATED : June 3, 2014
INVENTOR(S) : Lam et al.

It is certified that error appears in the above-identified patent and that said Letters Patent is hereby corrected as shown below:

In the Specification

In column 6, line 66, delete "(e.g." and insert -- (e.g., --, therefor.

Signed and Sealed this
Ninth Day of December, 2014

Michelle K. Lee
*Deputy Director of the United States Patent and Trademark Office*